(12) United States Patent
Tsukagoshi

(10) Patent No.: US 10,582,270 B2
(45) Date of Patent: Mar. 3, 2020

(54) SENDING DEVICE, SENDING METHOD, RECEIVING DEVICE, RECEIVING METHOD, INFORMATION PROCESSING DEVICE, AND INFORMATION PROCESSING METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 13 days.

(21) Appl. No.: 15/551,478

(22) PCT Filed: Feb. 10, 2016

(86) PCT No.: PCT/JP2016/053912
§ 371 (c)(1),
(2) Date: Aug. 16, 2017

(87) PCT Pub. No.: WO2016/136468
PCT Pub. Date: Sep. 1, 2016

(65) Prior Publication Data
US 2018/0027300 A1 Jan. 25, 2018

(30) Foreign Application Priority Data
Feb. 23, 2015 (JP) .................................. 2015-033260

(51) Int. Cl.
*H04N 21/488* (2011.01)
*H04N 21/236* (2011.01)
(Continued)

(52) U.S. Cl.
CPC ....... *H04N 21/4884* (2013.01); *G06F 17/218* (2013.01); *G06F 17/2247* (2013.01);
(Continued)

(58) Field of Classification Search
CPC ............ H04N 21/4884; H04N 21/236; H04N 21/8543; H04N 21/8547
See application file for complete search history.

(56) References Cited

U.S. PATENT DOCUMENTS

2002/0157116 A1* 10/2002 Jasinschi ............ G06K 9/00711
725/136
2008/0195386 A1* 8/2008 Proidl .................. G10L 13/033
704/235
(Continued)

FOREIGN PATENT DOCUMENTS

JP 2010-21991 A 1/2010
JP 2012-169885 A 9/2012
(Continued)

OTHER PUBLICATIONS

International Search Report dated May 10, 2010 in PCT/JP2016/053912 filed Feb. 10, 2016.

*Primary Examiner* — Hai V Tran
(74) *Attorney, Agent, or Firm* — Oblon, McClelland, Maier & Neustadt, L.L.P.

(57) ABSTRACT

A process with subtitles text information can be performed on the receiving side more appropriately.
A video stream having encoded image data is generated. A subtitles stream having subtitles text information corresponding to utterances of a predetermined number of utterers and meta information for analyzing each utterance is generated. A container with a predetermined format including the video stream and the subtitles stream is sent. For example, the meta information includes an identifier for identifying an utterer of each utterance, attribute information of the utterer of each utterance, and the like.

7 Claims, 11 Drawing Sheets

(51) Int. Cl.
  *H04N 21/233*  (2011.01)
  *G06F 17/21*  (2006.01)
  *G06F 17/28*  (2006.01)
  *G06F 17/27*  (2006.01)
  *G06F 17/22*  (2006.01)

(52) U.S. Cl.
  CPC .......... *G06F 17/277* (2013.01); *G06F 17/279* (2013.01); *G06F 17/289* (2013.01); *H04N 21/233* (2013.01); *H04N 21/236* (2013.01); *H04N 21/23614* (2013.01)

(56) References Cited

U.S. PATENT DOCUMENTS

| | | | |
|---|---|---|---|
| 2009/0310021 A1 | 12/2009 | Kondo et al. | |
| 2013/0076981 A1* | 3/2013 | Labrozzi | H04N 5/04 348/500 |
| 2013/0196292 A1* | 8/2013 | Brennen | G09B 19/06 434/157 |
| 2014/0019583 A1* | 1/2014 | Sethuraman | H04L 65/601 709/217 |
| 2014/0208351 A1* | 7/2014 | Moore | H04N 21/4856 725/35 |
| 2014/0240472 A1 | 8/2014 | Hamasaki et al. | |
| 2015/0067734 A1* | 3/2015 | Asai | H04N 21/4314 725/42 |
| 2017/0302900 A1* | 10/2017 | Besnard | H04N 9/8233 |

FOREIGN PATENT DOCUMENTS

| | | |
|---|---|---|
| WO | 2013/054371 A1 | 4/2013 |
| WO | 2014/196457 A1 | 12/2014 |

\* cited by examiner

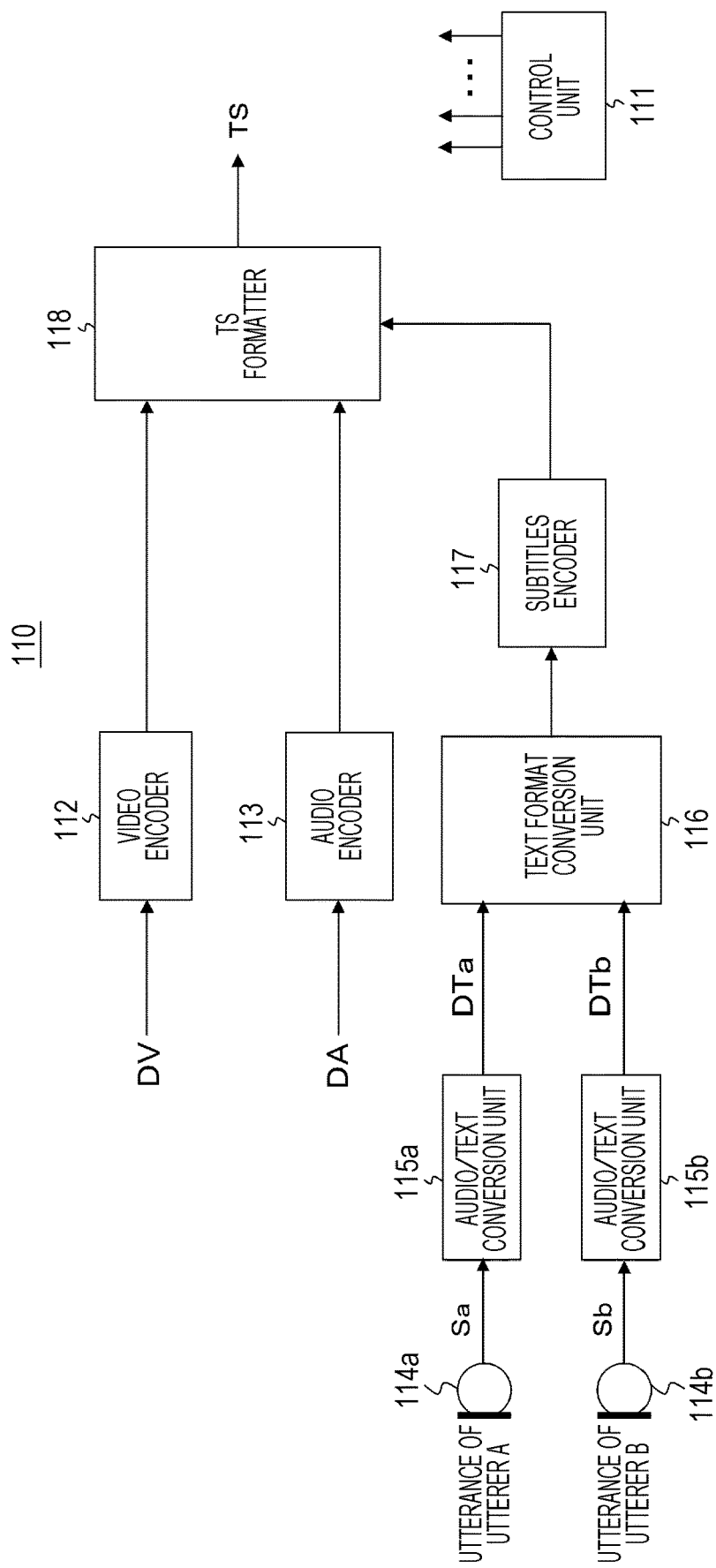

FIG. 3

TTML STRUCTURE

```
<tt xml:lang="" xmlns="http://www.w3.org/ns/ttml">
  <head>
    <metadata/>
    <styling/>
    <layout/>
  </head>
  <body/>
</tt>
```

FIG. 4

TTML Metadata (TTM)

(a)
```
<metadata xmlns:ttm="http://www.w3.org/ns/ttml#metadata">
    <ttm:title>Timed Text TTML Example</ttm:title>
    <ttm:copyright>The Authors (c) 2006</ttm:copyright>
    <ttmext: voice_id="a" sex="m" age="30" char="mild" language_id="english">
    <ttmext: voice_id="b" sex="f" age="25" char="smart"&"sharp" language_id=english" >

</metadata>
```

TTML Styling (TTS)

(b)
```
<styling xmlns:tts="http://www.w3.org/ns/ttml#styling">
    <!-- s1 specifies default color, font, and text alignment -->
    <style xml:id="s1"
        tts:color="white"
        tts:fontFamily="proportionalSansSerif"
        tts:fontSize="22px"
        tts:textAlign="center"
    />
    <!-- alternative using yellow text but otherwise the same as style s1 -->
    <style xml:id="s2" style="s1" tts:color="yellow"/>
    <!-- a style based on s1 but justified to the right -->
    <style xml:id="s1Right" style="s1" tts:textAlign="end" />
    <!-- a style based on s2 but justified to the left -->
    <style xml:id="s2Left" style="s2" tts:textAlign="start" />
</styling>
```

TTML Layout (region)

(c)
```
<layout xmlns:tts="http://www.w3.org/ns/ttml#styling">
    <region xml:id="subtitleArea"
        style="s1"
        tts:extent="560px 62px"
        tts:padding="5px 3px"
        tts:backgroundColor="black"
        tts:displayAlign="after"
    />
</layout>
```

*FIG. 5*

TTML Body

```
<body partition="subtitleArea">
    <div>
        <p xml:id="subtitle1" begin="0.76s" end="3.45s">
        It seems a paradox, does it not,
        </p>
        <p xml:id="subtitle1" voice_id="a">
        </p>
        <p xml:id="subtitle2" begin="5.0s" end="10.0s">
        that the image formed on<br/>
        the Retina should be inverted?
        </p>
        <p xml:id="subtitle2" voice_id="b">
        </p>
        <p xml:id="subtitle3" begin="10.0s" end="16.0s" style="s2">
        It is puzzling, why is it<br/>
        we do not see things upside-down?
        </p>
        <p xml:id="subtitle3" voice_id="a">
        </p>
    </div>
</body>
```

FIG. 8

EXEMPLARY PERSON SUMMARIES THROUGH TEXT ANALYSIS

Step 1 WORD/PHRASE DIVISION

Step 2 CONTEXT/SEMANTIC ANALYSIS

Scene1
- A: WORRIER, METHODICAL
- B: LAZY, CAREFREE

Scene2
- A: CALM, NOT BOTHERED BY ROUGH FLIGHT
- B: NERVOUS, DISLIKE AIRPLANE

Step 3 SUMMARIZE CHARACTERS USING IDENTIFIERS (indexes) FOR UTTERERS

Identifier "a" in Scene 1 and identifier "a" in Scene 2 indicate the same person.
Identifier "b" in Scene 1 and identifier "b" in Scene 2 indicate the same person.

Since the identifiers (indexes) for the utterers are provided in Scenes 1 and 2, it can be recognized that the personality and the nature of the above person vary in accordance with the scene.
The absence of identifiers (indexes) causes a misunderstanding that A in Scene 1 and B in Scene 2 are the same person.
The presence of the identifiers (indexes) for the utterers enables identification, and accurate person summaries can be made.

Step 4 ADD ITEMS OF ATTRIBUTE INFORMATION OF UTTERERS, AND SUMMARIZE CHARACTERS IN PROGRAM

The following items of attribute information of the utterers transmitted using the TTM (TTML metadata) are added to the above items, <ttmext: voice_id="a" sex="m" age="30" char="mild" language_id="japanese">
<ttmext: voice_id="b" sex="m" age="50" char="smart"&"sharp" language_id="japanese"> whereby the summaries of the persons can be estimated as follows.

A is a hardworking, productive man who speaks Japanese and has a methodical personality.
He is the type of person to be accustomed to vehicles such as airplanes and act in a calm manner.

B is a middle-aged man who speaks Japanese and usually tends to be carefree.
However, he becomes the type of person to feel nervous while he is aboard an airplane.

FIG. 9

TEXT EXAMPLES OF CONVERSATIONS

Scene1
A: Did you lock up the house?
B: I suppose so.
A: You turned out the gas, didn't you?
B: Well, I'm not really sure.
A: I'm getting worried. I think I'll go back and check them, 'cause I didn't even check my mailbox.
B: We're on the train now. It should be OK.
A: Don't say such a carefree thing. What if a fire breaks out? We should get off the train now.
B: You are such a worrier! We'll miss our flight if we go back.

(a)

Scene2
A: It was a very rough takeoff, wasn't it?
B: Yeah, I had a desperate feeling that the airplane was going to crash.
A: The captain just said that we may have a somewhat rough flight because of turbulence.
B: That's enough to make me feel sick.
A: You're too nervous. Why don't you drink alcohol and get some sleep?
B: I think I'll take some medicine for airsickness.
A: Are you OK? Hold on until we land.
B: You're not bothered at all, are you? I wish we would land soon.

Scene1

WORD/PHRASE DIVISION

Time 1  Region1  index_a : "did you", "lock up", "house", "?"
Time 3  Region1  index_a : "turned out", "gas", "didn't you", "?"
Time 5  Region1  index_a : "worried", "I think I'll go back", "check"
        Region2  index_a : "didn't", "check", "mailbox"
Time 7  Region1  index_a : "don't say", "such a carefree thing", "what if", "fire", "breaks out", "we should get off the train"

Time 2  Region2  index_b : "I suppose", "so"
Time 4  Region2  index_b : "well", "not really sure"
Time 6  Region3  index_b : "we're on", "train", "now", "it should be", "OK"
Time 8  Region2  index_b : "such a worrier", "miss", "our flight", "if", "we go back"

CONTEXT/SEMANTIC ANALYSIS

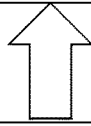

UTTERER IDENTIFIER "a"

A: He is worried about security and disaster prevention since he will stay away from home.
He thinks he wants to go back home and check several things.
He seems to have a methodical personality.
He thinks B is carefree.

UTTERER IDENTIFIER "b"

B: His attitude toward security and disaster prevention is ambiguous.
He seems to have a lazy personality.
He thinks A is a worrier.

FIG. 11

Scene2

WORD/PHRASE DIVISION

Time 11  Region1  index_a : "it was", "very", "rough", "takeoff"
Time 13  Region1  index_a : "captain", "just", "said", "we may have", "somewhat", "rough flight", "turbulence"
Time 15  Region1  index_a : "too nervous", "why don't you", "drink", "alcohol", "get some sleep"
Time 17  Region1  index_a : "are you OK?", "hold on", "until we land"

Time 12  Region2  index_b : "yeah", "I had", "desperate", "feeling", "airplane was going to", "crash"
Time 14  Region2  index_b : "that's", "enough to", "make me", "feel sick"
Time 16  Region2  index_b : "I think", "I'll take", "some medicine for airsickness"
Time 18  Region2  index_b : "you're", "not bothered at all", "are you"
Time 19  Region1  index_b : "wish we would land", "soon"

CONTEXT/SEMANTIC ANALYSIS

UTTERER IDENTIFIER "a"

A: He is on board calmly despite the rough flight, i.e., the situation during takeoff and the announcement.
He thinks B is too nervous.
He advises B to hold on and drink alcohol to get some sleep.

UTTERER IDENTIFIER "b"

B: He worried that the airplane would fall down.
He hates a rough flight.
He thinks he will take some medicine for airsickness.
He wishes they would land soon.
He thinks A is not bothered at all.

FIG. 12

TTML Metadata (TTM)

(a)
```
<metadata xmlns:ttm="http://www.w3.org/ns/ttml#metadata">
   <ttmext: voice_id="A" sex="m" age="30" char="mild" language_id="japanese">
   <ttmext: voice_id="B" sex="m" age="50" char="smart"&"sharp" language_id="japanese" >
</metadata>
```

TTML Body (b)
```
<body partition="subtitleSummary">
    <div>
        <p xml:id="subtitle1": begin="Time1 " end="Time1+T1">
            ttm:voice_id=a
            ttm:list= "did you", "lock up", "house", "?"
        </p>
    </div>
</body>
```

```
<body partition="subtitleSummary">
    <div>
        <p xml:id="subtitle2": begin="Time2 " end="Time2+T2">
            ttm:voice_id=b
            ttm:list= ""I suppose", "so"
        </p>
    </div>
</body>
```

SENDING DEVICE, SENDING METHOD, RECEIVING DEVICE, RECEIVING METHOD, INFORMATION PROCESSING DEVICE, AND INFORMATION PROCESSING METHOD

TECHNICAL FIELD

The present technology relates to a sending device, a sending method, a receiving device, a receiving method, an information processing device, and an information processing method, and particularly to a sending device or the like that transmits subtitles text information together with image data.

BACKGROUND ART

Conventionally, in the broadcasting or the like conforming to digital video broadcasting (DVB), for example, the operation of sending subtitles information using bitmap data is performed. In recent years, an idea of sending subtitles information using text character codes, that is, on a text basis, has been proposed. In this case, font expansion is performed on the receiving side in accordance with the resolution.

In addition, an idea of attaching timing information to text information in a case where subtitles information is sent on a text basis has been proposed. The World Wide Web Consortium (W3C) has suggested timed text markup language (TTML) as an example of the text information (refer to Patent Document 1).

CITATION LIST

Patent Document

Patent Document 1: Japanese Patent Application Laid-Open No. 2012-169885

SUMMARY OF THE INVENTION

Problems to be Solved by the Invention

An object of the present technology is to ensure that a process with subtitles text information can be appropriately performed on the receiving side.

Solutions to Problems

A concept of the present technology is a sending device including: a video encoding unit configured to generate a video stream having encoded image data; a subtitles encoding unit configured to generate a subtitles stream having subtitles text information corresponding to utterances of a predetermined number of utterers and meta information for analyzing each utterance; and a sending unit configured to send a container with a predetermined format including the video stream and the subtitles stream.

In the present technology, the video stream having the encoded image data is generated by the video encoding unit. The subtitles stream is generated by the subtitles encoding unit. The subtitles stream has the subtitles text information corresponding to the utterances of a predetermined number of utterers and the meta information for analyzing each utterance.

For example, the meta information may include an identifier for identifying an utterer of each utterance. In this case, for example, the meta information may further include attribute information of the utterer of each utterance. For example, the subtitles stream may have the subtitles text information and the meta information as TTML data or data with a TTML-derived format.

The container with the predetermined format including the video stream and the subtitles stream is transmitted by the sending unit. For example, the container may be a transport stream (MPEG-2 TS) adopted in the digital broadcasting standard. Alternatively, for example, the container may be MP4 for use in the Internet delivery or the like, or a container with a different format.

As described above, in the present technology, the subtitles stream has the meta information for analyzing each utterance in addition to the subtitles text information corresponding to the utterances of a predetermined number of utterers. On the receiving side, therefore, a process with the subtitles text information can be performed more appropriately with reference to the meta information.

Furthermore, another concept of the present technology is a receiving device including: a receiving unit configured to receive a container with a predetermined format including a video stream having encoded image data and a subtitles stream having subtitles text information corresponding to utterances of a predetermined number of utterers and meta information for analyzing each utterance; an information extracting unit configured to extract the subtitles test information and the meta information from the subtitles stream; and an information processing unit configured to perform a process with the subtitles text information and the meta information extracted.

In the present technology, the container with the predetermined format is received by the receiving unit. The container includes at least the video stream having the encoded image data and the subtitles stream having the subtitles text information corresponding to the utterances of a predetermined number of utterers and the meta information for analyzing each utterance.

The subtitles text information and the meta information are extracted from the subtitles stream by the information processing unit. Then, the process with the subtitles text information and the meta information extracted is performed by the information processing unit. For example, the meta information may include an identifier for identifying an utterer of each utterance. In this case, for example, the meta information may further include attribute information of the utterer of each utterance.

For example, the information processing unit may refer to the meta information and perform semantic analysis and contextualization on the subtitles text information to create a person summary or a subtitles summary for each utterer or translate subtitles of each utterance into another language.

Furthermore, for example, the information processing unit may be configured to send the subtitles text information and the meta information to an external device, and receive, from the external device, a person summary or a subtitles summary for each utterer created through semantic analysis and contextualization performed on the subtitles text information with reference to the meta information, or a result of translation of subtitles of each utterance into another language obtained through semantic analysis and contextualization performed on the subtitles text information with reference to the meta information.

As described above, in the present technology, the process is performed using the meta information for analyzing each utterance together with the subtitles text information corresponding to the utterances of a predetermined number of utterers. Therefore, the process with the subtitles text information can be performed more appropriately with reference to the meta information.

Furthermore, another concept of the present technology is an information processing device including: a receiving unit configured to receive, from an external device, subtitles text information corresponding to utterances of a predetermined number of utterers and meta information for analyzing each utterance; an information processing unit configured to perform a process with the subtitles text information and the meta information; and a sending unit, configured to send a result of the process to the external device.

In the present technology, the subtitles text information corresponding to the utterances of a predetermined number of utterers and the meta information for analyzing each utterance are received by the receiving unit from the external device. The process with the subtitles text information and the meta information is per formed by the information processing unit. For example, the information processing unit may refer to the meta information and perform semantic analysis and contextualization on the subtitles text information to create a person summary or a subtitles summary for each utterer or translate subtitles of each utterance into another language. The result of the process is sent by the sending unit to the external device.

As described above, in the present technology, the process is performed using the subtitles text information corresponding to the utterances of a predetermined number of utterers and the meta information for analyzing each utterance received from the external device, and the result is sent to the external device. Therefore, the processing load on the external device can be reduced.

Effects of the Invention

According to the present technology, a process with subtitles text information can be performed on the receiving side more appropriately. Note that the effects described in the present description are only examples, and the effects of the present invention are not limited to these effects. Additional effects may also be obtained.

BRIEF DESCRIPTION OF DRAWINGS

FIG. 2 is a block diagram illustrating an exemplary configuration of a stream generation unit of a broadcast transmission system.

FIG. 3 is a diagram for explaining a TTML structure.

FIGS. 4(a) to 4(c) are diagrams illustrating exemplary structures of respective elements which exist in a header (head) of the TTML structure, i.e., metadata, styling, and layout.

FIG. 5 is a diagram illustrating an exemplary structure of a body of the TTML structure.

FIG. 8 is a diagram for explaining an exemplary procedure for a process of generating a person summary for each utterer in an information processing unit.

FIGS. 9(a) and 9(b) are diagrams illustrating text examples of conversations.

FIG. 10 is a diagram illustrating an exemplary word/dividing process and an exemplary context/semantic analyzing process.

FIG. 11 is a diagram illustrating an exemplary word/dividing process and an exemplary context/semantic analyzing process.

FIGS. 12(a) and 12(b) are diagrams illustrating examples of TTML Metadata and TTML Body sent from the television receiver to an external device.

MODE FOR CARRYING OUT THE INVENTION

Hereinafter, a mode for carrying out the invention (hereinafter referred to as an "embodiment") will be described. Note that the description will be provided in the following order:

1. Embodiment
2. Variation

<1. Embodiment>

[Exemplary Configuration of Sending/Receiving System]

Figure 1:
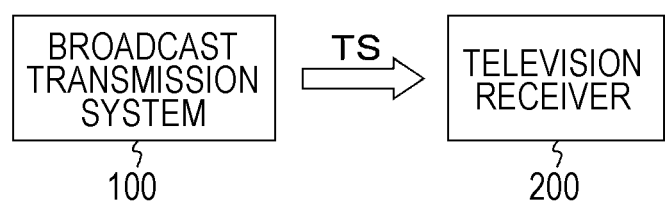
FIG. 1 is a block diagram illustrating an exemplary configuration of a sending/receiving system as an embodiment.

FIG. 1 is a diagram illustrating an exemplary configuration of a sending/receiving system 10 as an embodiment. The sending/receiving system 10 includes a broadcast transmission system 100 and a television receiver 200. The broadcast transmission system 100 sends a transport stream TS as a multiplexed stream through a broadcast wave.

The transport stream TS has at least a video stream and a subtitles stream. The video stream has encoded image data. The subtitles stream has subtitles text information corresponding to utterances of a predetermined number of utterers and meta information for analyzing each utterance. In the present embodiment, the meta information includes an identifier for identifying an utterer of each utterance and attribute information of the utterer of each utterance. Note that only the identifier may be included as the meta information, or other types of information such as information about the environment for each utterance may be included as the meta information.

The television receiver 200 receives the transport stream TS sent from the broadcast transmission system 100 using the broadcast wave. As described above, the transport stream TS has at least the video stream and the subtitles stream. Note that the transport stream TS may include an audio stream in some cases. The subtitles stream includes the meta information for analyzing each utterance in addition to the subtitles text information corresponding to the utterances of a predetermined number of utterers.

The television receiver 200 performs a decoding process on the video stream to obtain image data, and performs a decoding process on the subtitles text information extracted from the subtitles stream to obtain bitmap data of the subtitles (captions). Then, the television receiver 200 superimposes the bitmap data of the subtitles (captions) on the image data, and displays an image subjected to the superimposition of the subtitles.

In addition, using the subtitles text information and the meta information extracted from the subtitles stream, the television receiver 200 acquires a person summary or a subtitles summary for each utterer, or a result of translating the subtitles of each utterance into another language. The television receiver 200 itself performs a process of generating the person summary or subtitles summary for each utterer or a process of translating the subtitles of each utterance into another language. Alternatively, the television receiver 200 causes an external device on a cloud, that is, an external device connected via a network, to perform these processes.

The television receiver 200 superimposes, on an image, the acquired person summary or subtitles summary for each utterer or the acquired result of translating the subtitles of each utterance into another language, for example, in accordance with the selecting operation by a user, and displays the image subjected to the superimposition.

[Exemplary Configuration of Stream Generation Unit of Broadcast Transmission System]

FIG. 2 is a diagram illustrating an exemplary configuration of a stream generation unit 110 of the broadcast transmission system 100. The stream generation unit 110 has a control unit 111, a video encoder 112, an audio encoder 113, microphones 114a and 114b, audio/text conversion units 115a and 115b, a text format conversion unit 116, a subtitles encoder 117, and a TS formatter (multiplexer) 118.

The control unit 111 is configured to include, for example, a central processing unit (CPU), and controls the operation of each component of the stream generation unit 110. Image data DV are input to the video encoder 112. The video encoder 112 encodes the image data DV to generate a video stream including PES packets with the encoded image data arranged in the payloads. Audio data DA are input to the audio encoder 113. The audio encoder 113 encodes the audio data DA to generate an audio stream including PES packets with the encoded audio data arranged in the payloads.

The microphone 114a converts an utterance of an utterer A into audio data Sa. The audio/text conversion unit 115a converts the audio data Sa into text data (character codes) DTa as subtitles information. The microphone 114b converts an utterance of an utterer B into audio data Sb. The audio/text conversion unit 115b converts the audio data Sb into text data (character codes) DTb as subtitles information. The conversion processes in the audio/text conversion units 115b and 115b may be performed manually or automatically. In addition, the pieces of audio data Sa and Sb can be input to the audio encoder 113 in parallel with the audio data DA.

The pieces of text data DTa and DTb as the subtitles information are input to the text format conversion unit 116, and subtitles text information with a predetermined format is obtained. Examples of the text information include TTML and a TTML-derived format. The present embodiment is based on the premise of the TTML.

FIG. 3 is a diagram illustrating a TTML structure. The TTML is described on an XML basis. Respective elements, i.e., metadata, styling, and layout, exist in a header (head). FIG. 4(*a*) is a diagram illustrating an exemplary structure of the metadata (TTM: TTML Metadata). The metadata include information about the title of the metadata and information about copyright.

In addition, the metadata include items of attribute information of the utterers in association with identifiers for identifying the utterer A and the utterer B. Item 'voice_id="a"' indicates the identifier for the utterer A, and the attribute information including 'sex="m"', 'age="30"', 'char="mild"', and 'language_id="english"' is arranged in association with this identifier. Item 'sex="m"' indicates that the sex is male. Item 'age="30"' indicates that the age is 30. Item 'char="mild"' indicates that the personality is gentle. Item 'language_id="english"' indicates that the language is English.

In addition, item 'voice_id="b"' indicates the identifier for the utterer B, and the attribute information including 'sex="f"', 'age="25"', 'char="smart"& "sharp"', and 'language_id="english"' is arranged in association with this identifier. Item 'sex="f"' indicates that the sex is female. Item 'age="25"' indicates that the age is 25. Item 'char="smart"&"sharp"' indicates that the personality is clever and shrewd. Item 'language_id="english"' indicates that the language is English.

Note that the illustrated types of attribute information are only examples. Not all of them need to be arranged, and other types of attribute information may be arranged. Additionally, although, in the illustrated example, the items of attribute information of the utterer A and the utterer B are included, other items of information related to the utterances of the utterer A and the utterer B, e.g., environmental information such as place and time, may be included.

FIG. 4(*b*) is a diagram illustrating an exemplary structure of the styling (TTS: TTML Styling). The styling includes items of information such as color, font (fontFamily), size (fontSize), and alignment (textAlign) as well as an identifier (id). FIG. 4(*c*) is a diagram illustrating an exemplary structure of the layout (region: TTML layout). The layout includes items of information such as range (extent), offset (padding), background color (backgroundColor), and alignment (displayAlign) as well as an identifier (id) for a region where the subtitles are arranged.

FIG. 5 is a diagram illustrating an exemplary structure of a body. In the illustrated example, items of information about three subtitles, i.e., Subtitles 1 (subtitle1), Subtitles 2 (subtitle2), and Subtitles 3 (subtitle3), are included. For each of the subtitles, text data are described together with a display start timing and a display end timing, and an identifier for an utterer corresponding to the text data is described. For example, regarding Subtitles 1 (subtitle1), the display start timing is "0.76s", the display end timing is "3.45s", the text data are "It seems a paradox, dose it not," and the identifier is "a" indicating the utterer A.

Furthermore, regarding Subtitles 2 (subtitle2), the display start timing is "5.0s", the display end timing is "10.0s", the text data are "that the image formed on<br/>the Retina should be inverted?", and the identifier is "b" indicating the utterer B. Furthermore, regarding Subtitles 3 (subtitle3), the display start timing is "10.0s", the display end timing is "16.0s", the text data are "It is puzzling, why is it<br/>we do not see things upside-down?", and the identifier is "a" indicating the utterer A.

Returning to FIG. 2, the subtitles encoder 117 converts the TTML obtained by the text format conversion unit 116 into various segments, and generates a subtitles stream including PES packets with these segments arranged in the payloads. Note that instead of placing the TTML on the segments and arranging the segments in the payloads of the PES packets, it is also possible to arrange the TTML directly in the payloads of the PES packets.

The TS formatter 118 performs multiplexing by converting the video stream generated by the video encoder 112, the audio stream generated by the audio encoder 113, and the subtitles stream generated by the subtitles encoder 117 into transport packets, and obtains the transport stream TS as a multiplexed stream.

The operation of the stream generation unit 110 illustrated in FIG. 2 will be briefly described. The image data DV are supplied to the video encoder 112. In the video encoder 112, the image data DV are encoded, and the video stream (PES stream) including the video PES packets with the encoded image data held in the payloads is generated. The video stream is supplied to the TS formatter 118.

In addition, the audio data DA are supplied to the audio encoder 113. In the audio encoder 113, the audio data DA are encoded, and the audio stream (PES stream) including the audio PES packets with the encoded audio data is generated. The audio stream is supplied to the TS formatter 118.

In addition, the text data (character codes) DTa as the subtitles information corresponding to the utterance of the utterer A and obtained by the audio/text conversion unit 115a and the text data (character codes) DTb as the subtitles information corresponding to the utterance of the utterer B and obtained by the audio/text conversion unit 115b are supplied to the text format conversion unit 116.

In the text format conversion unit 116, the TTML as the subtitles text information is obtained on the basis of the pieces of text data DTa and DTb2 as the subtitles information. In the TTML, the identifiers for identifying the utterer A and the utterer B are described in association with the pieces of text data of the respective subtitles (refer to FIG. 5). In addition, in the TTML, the items of attribute information of the utterers and the like are described in association with the identifiers for identifying the utterer A and the utterer B (refer to FIG. 4(a)). The TTML is supplied to the subtitles encoder 117.

In the subtitles encoder 117, the TTML is converted into various segments, and the subtitles stream including the PES packets with these segments arranged in the payloads of the PES packets with the TTML directly arranged in the payloads is generated. The subtitles stream is supplied to the TS formatter 118.

In the TS formatter 118, the video stream generated toy the video encoder 112, the audio stream generated by the audio encoder 113, and the subtitles stream generated by the subtitles encoder 117 are converted into the transport packets and multiplexed, and the transport stream TS as the multiplexed stream is generated. The transport stream TS is sent from a sending unit (not illustrated) through the broadcast wave.

[Exemplary Configuration of Television Receiver]

Figure 6:
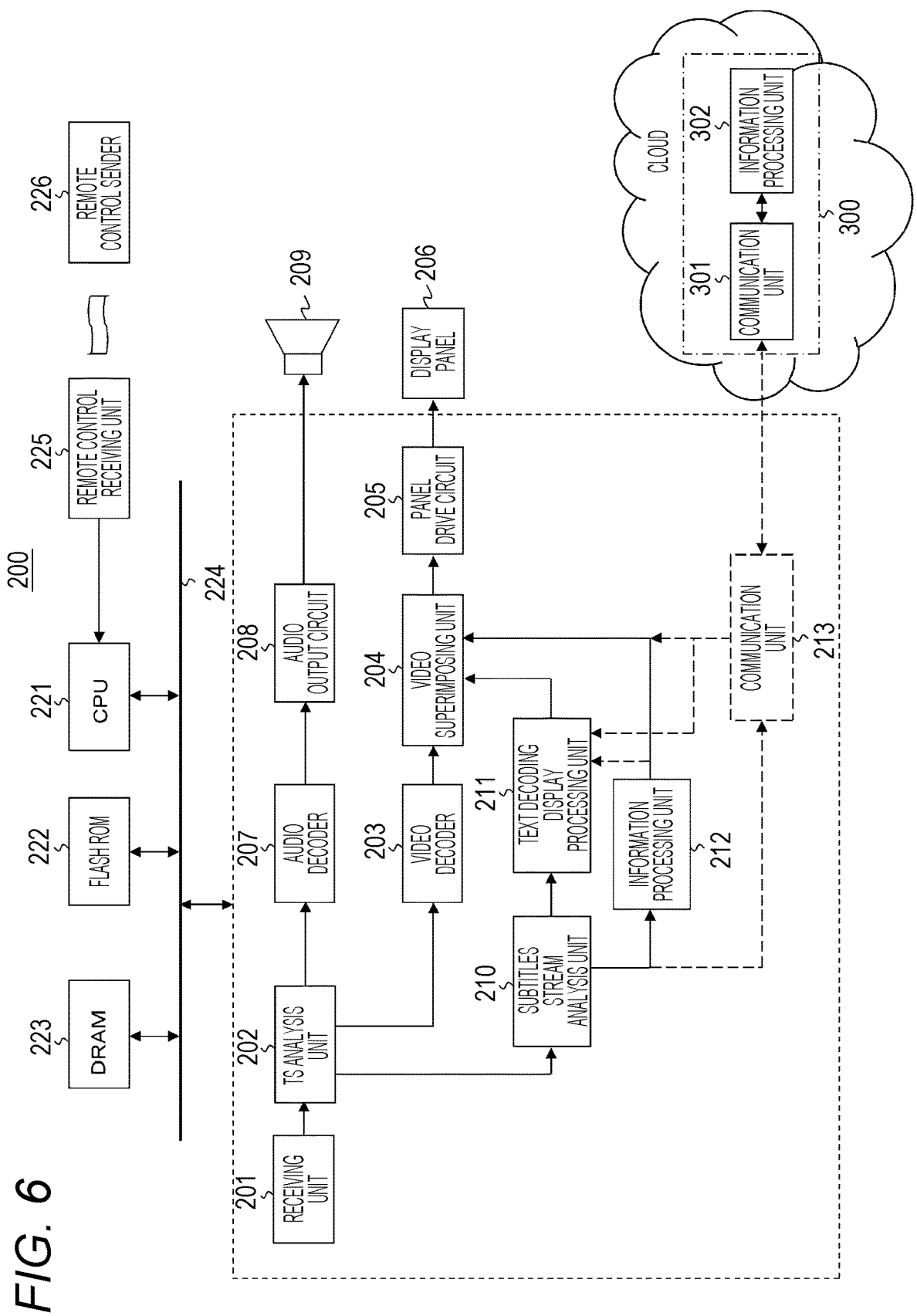
FIG. 6 is a block diagram illustrating an exemplary configuration of a television receiver.

FIG. 6 is a diagram illustrating an exemplary configuration of the television receiver 200. The television receiver 200 has a receiving unit 201, a TS analysis unit (demultiplexer) 202, a video decoder 203, a video superimposing unit 204, a panel drive circuit 205, and a display panel 206. The television receiver 200 also has an audio decoder 207, an audio output circuit 208, and a speaker 209.

The television receiver 200 also has a subtitles stream analysis unit 210, a text decoding display processing unit 211, and an information processing unit 212. The television receiver 200 also has a CPU 221, a flash ROM 222, a DRAM 223, an internal bus 224, a remote control receiving unit 225, and a remote control sender 226.

The CPU 221 controls the operation of each component of the television receiver 200. The flash ROM 222 accommodates control software and stores data. The DRAM 223 constitutes a work area of the CPU 221. The CPU 221 expands software and data read from the flash ROM 222 on the DRAM 223 to start the software, and controls each component of the television receiver 200.

The remote control receiving unit 225 receives a remote control signal (remote control code) sent from the remote control sender 226, and supplies the remote control code to the CPU 221. The CPU 221 controls each component of the television receiver 200 on the basis of the remote control code. The CPU 221, the flash ROM 222, and the DRAM 223 are connected to the internal bus 224.

The receiving unit 201 receives the transport stream TS sent from the broadcast transmission system 100 through the broadcast wave. As described above, the transport stream TS includes the video stream, the audio stream, and the subtitles stream. The TS analysis unit 202 extracts the respective streams, i.e., the video, audio, and subtitles streams, from the transport stream TS.

The audio decoder 207 performs the decoding process on the audio stream extracted by the TS analysis unit 202 to obtain the audio data. The audio output circuit 208 performs necessary processes such as D/A conversion and amplification on the audio data, and supplies the processed audio data to the speaker 209. The video decoder 203 performs the decoding process on the video stream extracted by the TS analysis unit 202 to obtain the image data.

The subtitles stream analysis unit 210 classifies the TTML included in the subtitles stream extracted by the TS analysis unit 202, takes out the text information and display-related information, and sends these items of information to the text decoding display processing unit 211. The subtitles stream analysis unit 210 also takes out the text information and semantic analysis meta information, and sends these items of information to the information processing unit 212.

Figure 7:
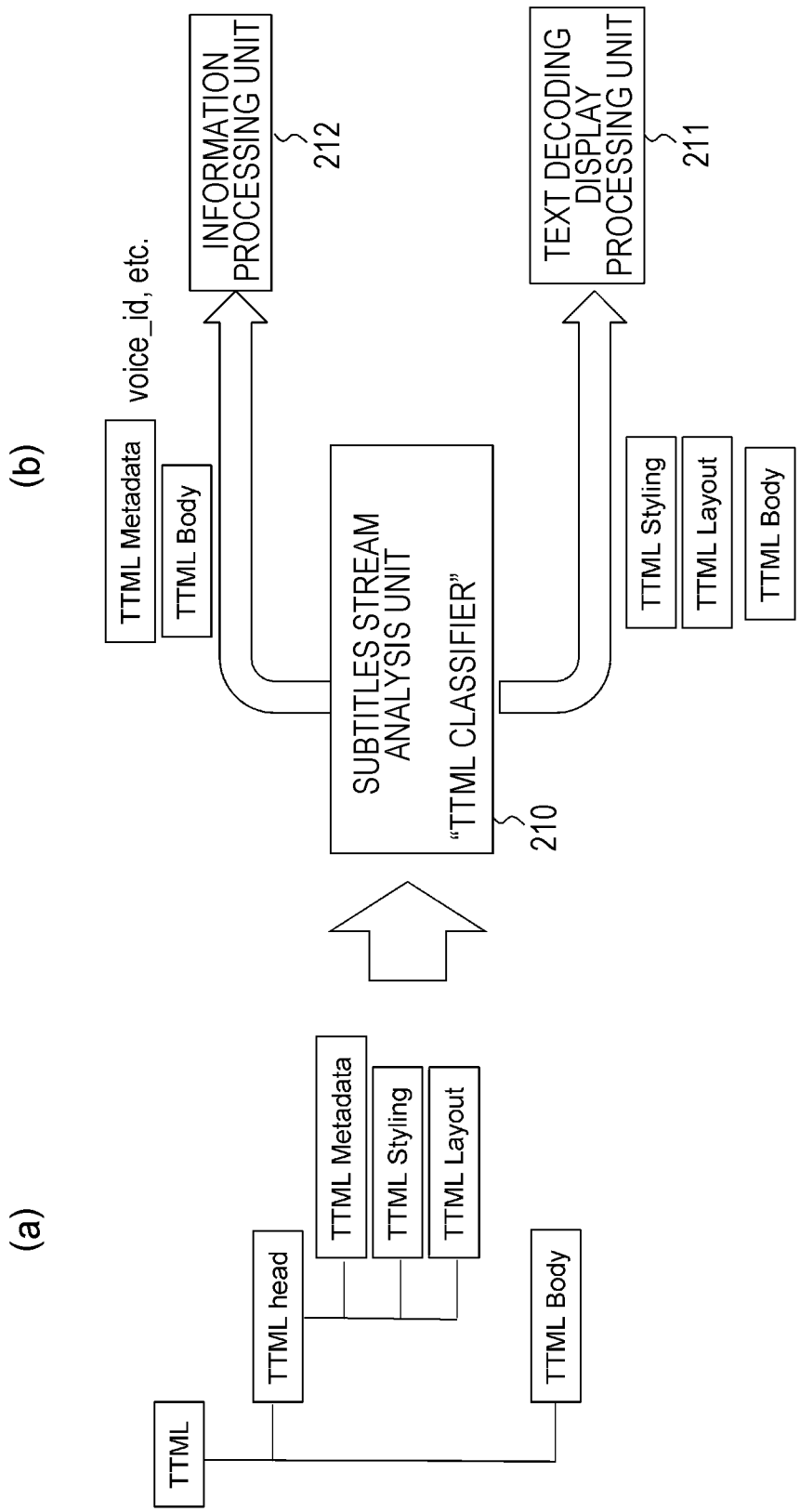
FIGS. 7(a) and 7(b) are diagrams for explaining operation of a subtitles stream analysis unit.

The subtitles stream analysis unit 210 will be further described. As illustrated in FIG. 7(a), the TTML includes the TTML header (TTML head) and the TTML Body, and the respective elements, i.e., the TTML Metadata, the TTML Styling, and the TTML Layout, exist in the TTML header.

As illustrated in FIG. 7(b), the subtitles stream analysis unit 210 takes out the TTML Styling, the TTML Layout, and the TTML Body from the TTML, and sends them to the text decoding display processing unit 211. Furthermore, as illustrated in FIG. 7(b), the subtitles stream analysis unit 210 takes out the TTML Metadata and the TTML Body from the TTML, and sends them to the information processing unit 212.

Returning to FIG. 6, the text decoding display processing unit 211 performs the decoding process on the text information and the display-related information (TTML Styling, TTML Layout, and TTML Body) to obtain bitmap data of each region to be superimposed on the image data.

The video superimposing unit 204 superimposes the bitmap data of each region obtained from the text decoding display processing unit 211 on the image data obtained by the video decoder 203. The panel drive circuit 205 drives the display panel 206 on the basis of the display image data obtained by the video superimposing unit 204. The display panel 206 includes, for example, a liquid crystal display (LCD), an organic electroluminescence display (organic EL display) or the like.

The information processing unit 212 performs a process with the text information and the semantic analysis meta information (TTML Metadata and TTML Body), and outputs the processing result. Examples of the process include the process of generating the person summary and the subtitles summary for each utterer and the process of translating the subtitles of each utterance into another language. In this case, the information processing unit 212 obtains bitmap data for displaying the processing result.

FIG. 8 is a diagram for explaining an exemplary procedure for the process of generating the person summary for each utterer in the information processing unit 212. The following description is based on text examples of conversations between the utterers A and B in Scene 1 and Scene 2 as illustrated in FIGS. 9(a) and 9(b).

First, as Step 1, a word/dividing process is executed. FIG. 10(a) is a diagram illustrating an exemplary word/dividing process related to the subtitles of the utterers A and B in Scene 1. FIG. 11(a) is a diagram illustrating an exemplary word/dividing process related to the subtitles of the utterers A and B in Scene 2.

Next, as Step 2, a context/semantic analyzing process is executed. FIG. 10(b) is a diagram illustrating an exemplary context/semantic analyzing process related to the subtitles of the utterers A and B in Scene 1. FIG. 11(*b*) is a diagram illustrating an exemplary context/semantic analyzing process related to the subtitles of the utterers A and B in Scene 2. Note that the result of the context/semantic analyzing process constitutes the subtitles summary for each utterer. In the case of performing the process of generating the subtitles summary for each utterer, the information processing unit 212 outputs, for example, the result of the context/semantic analyzing process. Note that the output of the information processing unit 212 can take the form of text. In this case, the text output passes through the text decoding display processing unit 211 to undergo the bitmap conversion, and is supplied to the video superimposing unit 204.

Next, as Step 3, a process of creating summaries of characters using utterer identifiers is executed. Identifier "A" in Scene 1 and identifier "A" in Scene 2 indicate the same person. Similarly, identifier "B" in Scene 1 and identifier "B" in Scene 2 indicate the same person. Since the identifiers for the utterers are provided in Scenes 1 and 2, it can be recognized that the personality and the nature of the person vary in accordance with the scene. The absence of identifiers causes a misunderstanding that the utterer A in Scene 1 and the utterer B in Scene 2 are the same person. The presence of the identifiers for the utterers enables identification, and accurate person summaries can be made.

Next, as Step 4, the items of attribute information of the utterers are added, and a process of creating summaries of the characters in the program is executed. Consequently, the items of attribute information of the utterers A and B transmitted using the TTML metadata (refer to FIG. 4(*a*)) are added, whereby the final summaries of the persons are estimated.

In the illustrated example, the person summary for the utterer A is generated as follows: "A hardworking, productive man who speaks Japanese and has a methodical personality. He is the type of person to be accustomed to vehicles such as airplanes and act in a calm manner". Furthermore, the person summary for the utterer B is generated as follows: "A middle-aged man who speaks Japanese and usually tends to be carefree. However, he becomes the type of person to feel nervous while he is aboard an airplane".

Note that, although a detailed description is omitted, even in the case of performing the process of translating the subtitles of each utterance into another language in the information processing unit 212, an utterer-basis translation can be performed on the basis of the identifiers for the utterers. In addition, with reference to the attribute information of each utterer, the translation into another language can be performed more appropriately in accordance with the information such as sex, age, personality, spoken language and the like.

Returning to FIG. 6, the video superimposing unit 204 superimposes the bitmap data of each region obtained by the text decoding display processing unit 211 on the image data obtained by the video decoder 203 in accordance with the display selecting operation by the user. In addition, the video superimposing unit 204 superimposes the bitmap data of the processing result obtained by the information processing unit 212 on the image data obtained by the video decoder 203 in accordance with the display selecting operation by the user.

The panel drive circuit 205 drives the display panel 206 on the basis of the display image data obtained by the video superimposing unit 204. The display panel 206 includes, for example, a liquid crystal display (LCD), an organic electroluminescence display (organic EL display) or the like.

The operation of the television receiver 200 illustrated in FIG. 6 will be briefly described. In the receiving unit 201, the transport stream TS sent from the broadcast transmission system 100 through the broadcast wave is received. The transport stream TS includes the video stream, the audio stream, and the subtitles stream.

The video stream extracted by the TS analysis unit 202 is supplied to the video decoder 203. In the video decoder 203, the decoding process is performed on the video stream, and the image data are obtained. The image data are supplied to the video superimposing unit 204. In addition, the subtitles stream extracted by the TS analysis unit 202 is supplied to the subtitles stream analysis unit 210. In the subtitles stream analysis unit 210, the TTML included in the subtitles stream is classified.

Then, in the subtitles stream analysis unit 210, the TTML Styling, the TTML Layout, and the TTML Body are taken out as the text information and the display-related information, and supplied to the text decoding display processing unit 211. In addition, in the subtitles stream analysis unit 210, the TTML Metadata and the TTML Body are taken out as the text information and the semantic analysis meta information, and supplied to the information processing unit 212.

In the text decoding display processing unit 211, the decoding process is performed on the TTML Styling, the TTML Layout, and the TTML Body as the text information and the display-related information, and the bitmap data of each region to be superimposed on the image data are obtained. The bitmap data are supplied to the video superimposing unit 204. In the video superimposing unit 204, the bitmap data of each region obtained by the text decoding display processing unit 211 are superimposed on the image data obtained by the video decoder 203 in accordance with the display selecting operation by the user.

The display image data obtained by the video superimposing unit 204 are supplied to the panel drive circuit 205. In the panel drive circuit 205, the display panel 206 is driven on the basis of the display image data. Consequently, the image is displayed on the display panel 206, and the subtitles (captions) are superimposed on this image for display in accordance with the display selecting operation by the user.

Furthermore, in the information processing unit 212, the process with the TTML Metadata and the TTML Body as the text information and the semantic analysis meta information is performed, and the bitmap data for displaying the processing result are obtained. Examples of the process include the process of generating the person summary and the subtitles summary for each utterer and the process of translating the subtitles of each utterance into another language.

The bitmap data are supplied to the video superimposing unit 204. In the video superimposing unit 204, the bitmap data of the processing result obtained by the information processing unit 212 are superimposed on the image data obtained by the video decoder 203 in accordance with the display selecting operation by the user. Therefore, the processing result (e.g., the person summary and the subtitles summary for each utterer, or the result of translating the subtitles of each utterance into another language) is superimposed on the image displayed on the display panel 206 in accordance with the display selecting operation by the user.

In addition, the audio stream extracted by the TS analysis unit 202 is supplied to the audio decoder 207. In the audio decoder 207, the decoding process is performed on the audio stream, and the audio data are obtained.

The audio data are supplied to the audio output circuit 208. In the audio output circuit 208, necessary processes such as D/A conversion and amplification are performed on the audio data. Then, the processed audio data are supplied to the speaker 209. Consequently, the audio output corresponding to the image displayed on the display panel 206 is obtained from the speaker 209.

Note that, in the above-mentioned example, the process with the text information and the semantic analysis meta information (TTML Metadata and TTML Body) is performed by the information processing unit provided in the television receiver 200. Alternatively, this process may be performed by an external device on a cloud, that is, an external device connected via a network.

A communication unit 213 sends, to the external device 300 via the network, the text information and the semantic analysis meta information (TTML Metadata and TTML Body) taken out by the subtitles stream analysis unit 210, and receives, from the external device 300, the bitmap data for displaying the processing result (e.g., the person summary and the subtitles summary for each utterer, or the result of translating the subtitles of each utterance into another language).

The bitmap data are supplied to the video superimposing unit 204. In the video superimposing unit 204, the bitmap data of the processing result received by the communication unit 213 are superimposed on the image data obtained by the video decoder 203 in accordance with the display selecting operation by the user. Therefore, even in a case where the process is performed by the external device 300 as described above, the processing result (e.g., the person summary and the subtitles summary for each utterer, or the result of translating the subtitles of each utterance into another language) is superimposed on the image displayed on the display panel 206 in accordance with the display selecting operation by the user.

The external device 300 has a communication unit 301 and an information processing unit 302. The communication unit 301 receives the text information and the semantic analysis meta information (TTML Metadata and TTML Body) from the television receiver 200 via the network, and supplies these items of information to the information processing unit 302. The communication unit 301 also sends, to the television receiver 200 via the network, the bitmap data indicating the processing result supplied from the information processing unit 302.

For example, the communication unit 213 places the TTML Metadata and the TTML Body in an MP4 container, and sends the MP4 container to the external device 300. Note that, in this case, a text list obtained after the word/phrase division may be arranged in the TTML Body together with the identifiers for the utterers. In this manner, the processing time for the word/phrase division is reduced in the external device 300. FIGS. 12(*a*) and 12(*b*) are diagrams illustrating examples of the TTML Metadata and the TTML Body sent from the communication unit 213 to the external device 300.

FIG. 12(*b*) is an example of the TTML Body for the case where the word/phrase division is performed in the television receiver 200. Alternatively, the received TTML Body can be sent from the communication unit 213 to the external device 300 as it is without being subjected to the word/phrase division.

Note that the processing result obtained after the information process in the external device 300 may be input to the communication unit 213 of the television receiver 200 in a text format. In this case, the output of the communication unit 213 passes through the text decoding display processing unit 211 to undergo the bitmap conversion, and is supplied to the video superimposing unit 204.

The information processing unit 302 is configured to be similar to the above-mentioned information processing unit 212 in the television receiver 200. The information processing unit 302 performs the process with the text information and the semantic analysis meta information (TTML Metadata and TTML Body) supplied from the communication unit 301, and supplies the bitmap data indicating the processing result to the communication unit 301.

As described above, in the sending/receiving system 10 illustrated in FIG. 1, the subtitles stream has the meta information for analyzing each utterance in addition to the subtitles text information corresponding to the utterances of a predetermined number of utterers. Therefore, on the receiving side, the process with the subtitles text information (e.g., the process of generating the person summary and the subtitles summary for each utterer and the process of translating the subtitles of each utterance into another language) can be appropriately performed with reference to the meta information.

2. Variation

Note that, in the example described in the above embodiment, the TTML is used as the subtitles text information. However, the present technology is not limited to this example, and other types of timed text information having information equivalent to that in the TTML may be used. For example, a TTML-derived format may be used.

Furthermore, in the example described in the above embodiment, the sending/receiving system 10 includes the broadcast transmission system 100 and the television receiver 200. However, the configuration of the sending/receiving system to which the present, technology can be applied is not limited to this example. For example, the part corresponding to the television receiver 200 may be configured as a set top box and a monitor coupled together by a digital interface such as a high-definition multimedia interface (HDMI). Note that the "HDMI" is a registered trademark.

In addition, the present technology can also be configured as follows.

(1) A sending device including:

a video encoding unit configured to generate a video stream having encoded image data;

a subtitles encoding unit configured to generate a subtitles stream having subtitles text information corresponding to utterances of a predetermined number of utterers and meta information for analyzing each utterance; and a sending unit configured to send a container with a predetermined format including the video stream and the subtitles stream.

(2) The sending device according to (1), in which the meta information includes an identifier for identifying an utterer of each utterance.

(3) The sending device according to (2), in which the meta information further includes attribute information of the utterer of each utterance.

(4) The sending device according to any of (1) to (3), in which the subtitles stream has the subtitles text information and the meta information as TTML data or data with a TTML-derived format.

(5) A sending method including:

a video encoding step of generating a video stream having encoded image data;

a subtitles encoding step of generating a subtitles stream having subtitles text information corresponding to utterances of a predetermined number of utterers and meta information for analyzing each utterance; and a sending step of sending, by a sending unit, a container with a predetermined format including the video stream and the subtitles stream.

(6) A receiving device including:

a receiving unit configured to receive a container with a predetermined format including a video stream having encoded image data and a subtitles stream having subtitles text information corresponding to utterances of a predetermined number of utterers and meta information for analyzing each utterance;

an information extracting unit configured to extract the subtitles text information and the meta information from the subtitles stream; and an information processing unit configured to perform a process with the subtitles text information and the meta information extracted.

(7) The receiving device according to (6), in which the meta information includes an identifier for identifying an utterer of each utterance.

(8) The receiving device according to (7), in which the meta information further includes attribute information of the utterer of each utterance.

(9) The receiving device according to any of (6) to (8), in which the information processing unit refers to the meta information and performs semantic analysis and contextualization on the subtitles text information to create a person summary or a subtitles summary for each utterer or translate subtitles of each utterance into another language.

(10) The receiving device according to any of (6) to (8), in which the information processing unit is configured to:

send the subtitles text information and the meta information to an external device; and receive, from the external device, a person summary or a subtitles summary for each utterer created through semantic analysis and contextualization performed on the subtitles text information with reference to the meta information, or a result of translation of subtitles of each utterance into another language obtained through semantic analysis and contextualization performed on the subtitles text information with reference to the meta information.

(11) A receiving method including:

a receiving step of receiving, by a receiving unit, a container with a predetermined format including a video stream having encoded image data and a subtitles stream having subtitles text information corresponding to utterances of a predetermined number of utterers and meta information for analyzing each utterance;

an information extracting step of extracting the subtitles text information and the meta information from the subtitles stream; and an information processing step of performing a process with the subtitles text information and the meta information extracted.

(12) An information processing device including:

a receiving unit configured to receive, from an external device, subtitles text information corresponding to utterances of a predetermined number of utterers and meta information for analyzing each utterance;

an information processing unit configured to perform a process with the subtitles text information and the meta information; and a sending unit configured to send a result of the process to the external device.

(13) The information processing device according to (12), in which the information processing unit refers to the meta information and performs semantic analysis and contextualization on the subtitles text information to create a person summary or a subtitles summary for each utterer or translate subtitles of each utterance into another language.

(14) An information processing method including:

a receiving step of receiving, by a receiving unit from an external device, subtitles text information corresponding to utterances of a predetermined number of utterers and meta information for analyzing each utterance;

an information processing step of performing a process with the subtitles text information and the meta information; and a sending step of sending, by a sending unit, a result of the process to the external device.

The main feature of the present technology is that the subtitles stream has the meta information for analyzing each utterance in addition to the subtitles text information corresponding to the utterances of a predetermined number of utterers, so that the process with the subtitles text information can be appropriately performed on the receiving side (refer to FIGS. 2, 4(a) to 4(c)), and 5).

Reference Signs List

10 Sending/receiving system
100 Broadcast transmission system
110 Stream generation unit
111 Control unit
112 Video encoder
113 Audio encoder
114a, 114b Microphone
115a, 115b Audio/text conversion unit
116 Text format conversion unit
117 Subtitles encoder
118 TS formatter (multiplexer)
200 Television receiver
201 Receiving unit
202 TS analysis unit (demultiplexer)
203 Video decoder
204 Video superimposing unit
205 Panel drive circuit
206 Display panel
207 Audio decoder
208 Audio output circuit
209 Speaker
210 Subtitles stream analysis unit
211 Text decoding display processing unit
212 Information processing unit
213 Communication unit
300 External device
301 Communication unit
302 Information processing unit
221 CPU

The invention claimed is:

1. A receiving device comprising:
processing circuitry configured to
receive a container including a video stream having image data with a plurality of scenes and a subtitles stream having subtitles text information corresponding to utterances of utterers and meta information of the subtitles text information;
extract the subtitles text information and the meta information from the subtitles stream;

divide the subtitles text information into words or phrases, select, from the words or phrases, modifier words or phrases that characterize an utterer of the utterers in the plurality of scenes, determine across the plurality of scenes a correspondence between the utterer and the selected modifier words or phrases using utterer identifiers contained in the meta information, and generate a summary of the utterer by performing semantic analysis and contextualization on the subtitles text information based on the selected modifier words or phrases, the determined correspondence, and the meta information that includes demographic information and a personality type of the utterer.

2. The receiving device according to claim 1, wherein the meta information further includes attribute information of the utterer of each utterance, wherein the processing circuitry is further configured to add attribute information obtained from the meta information to the summary of the utterer.

3. The receiving device according to claim 2, wherein the demographic information includes the utterer's sex, age, and spoken language, and wherein the processing circuitry is further configured to generate the summary of the utterer based on one or more of the utterer's sex, age, personality type, and spoken language.

4. The receiving device according to claim 1, wherein the processing circuitry is configured to:

send the subtitles text information and the meta information to an external device; and receive, from the external device, the summary of the utterer.

5. A receiving method comprising:

receiving, by processing circuitry, a container including a video stream having image data with a plurality of scenes and a subtitles stream having subtitles text information corresponding to utterances of utterers and meta information of the subtitles text information;

extracting, by the processing circuitry, the subtitles text information and the meta information from the subtitles stream;

dividing the subtitles text information into words or phrases, selecting, from the words or phrases, modifier words or phrases that characterize an utterer of the utterers in the plurality scenes, determining across the plurality of scenes a correspondence between the utterer and the selected modifier words or phrases using utterer identifiers contained in the meta information, and generating a summary of the utterer by performing semantic analysis and contextualization on the subtitles text information based on the selected modifier words or phrases, the determined correspondence, and the meta information that includes demographic information and a personality type of the utterer.

6. An information processing device comprising:

processing circuitry configured to receive, from an external device, subtitles text information corresponding to utterances of utterers and meta information of the subtitles text information for each utterance;

divide the subtitles text information into words or phrases, select, from the words or phrases, modifier words or phrases that characterize an utterer of the utterers in a plurality of scenes, determine across the plurality of scenes a correspondence between the utterer and the selected modifier words or phrases using utterer identifiers contained in the meta information, and send to the external device a summary of the utterer that is generated by performing semantic analysis and contextualization on the subtitles text information based on the selected modifier words or phrases, the determined correspondence, and the meta information that includes demographic information and a personality type of the utterer.

7. An information processing method comprising:

receiving, by processing circuitry from an external device, subtitles text information corresponding to utterances of utterers and meta information of the subtitles text information for each utterance;

dividing the subtitles text information into words or phrases;

selecting from the words or phrases modifier words or phrases that characterize an utterer of the utterers in a plurality of scenes;

determining across the plurality of scenes a correspondence between the utterer and the selected modifier words or phrases using utterer identifiers contained in the meta information; and sending to the external device a summary of the utterer that is generated by performing semantic analysis and contextualization on the subtitles text information based on the selected modifier words or phrases, the determined correspondence, and the meta information that includes demographic information and a personality type of the utterer.

* * * * *